Sept. 10, 1935.　　　H. I. HOULETTE　　　2,014,332
APPARATUS FOR VULCANIZING RUBBER
Filed Oct. 29, 1934　　4 Sheets-Sheet 1

Inventor
Henry I. Houlette
W. S. McDowell
Attorney

Sept. 10, 1935.    H. I. HOULETTE    2,014,332
APPARATUS FOR VULCANIZING RUBBER
Filed Oct. 29, 1934    4 Sheets-Sheet 2
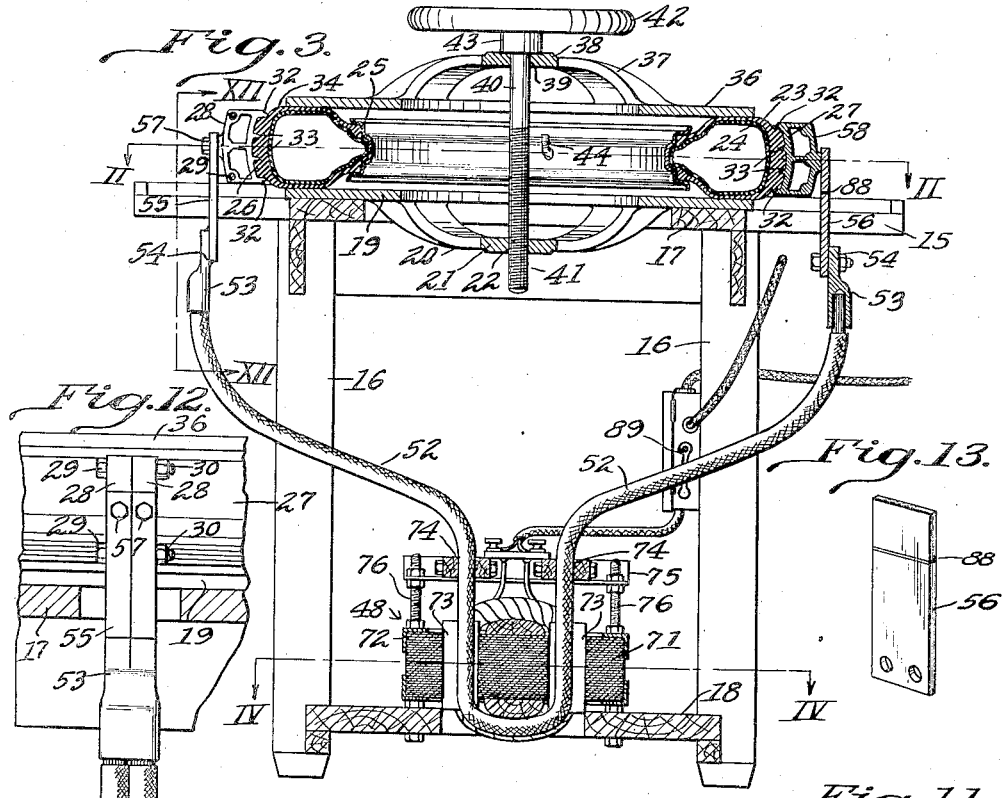
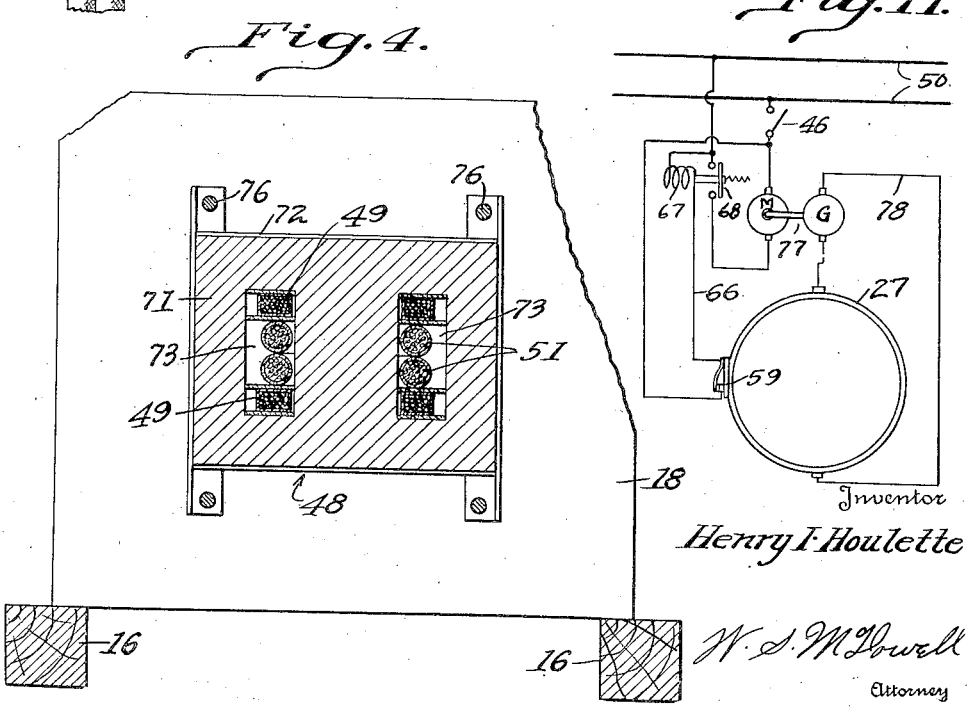
Inventor
Henry I. Houlette
W. S. McDowell
Attorney

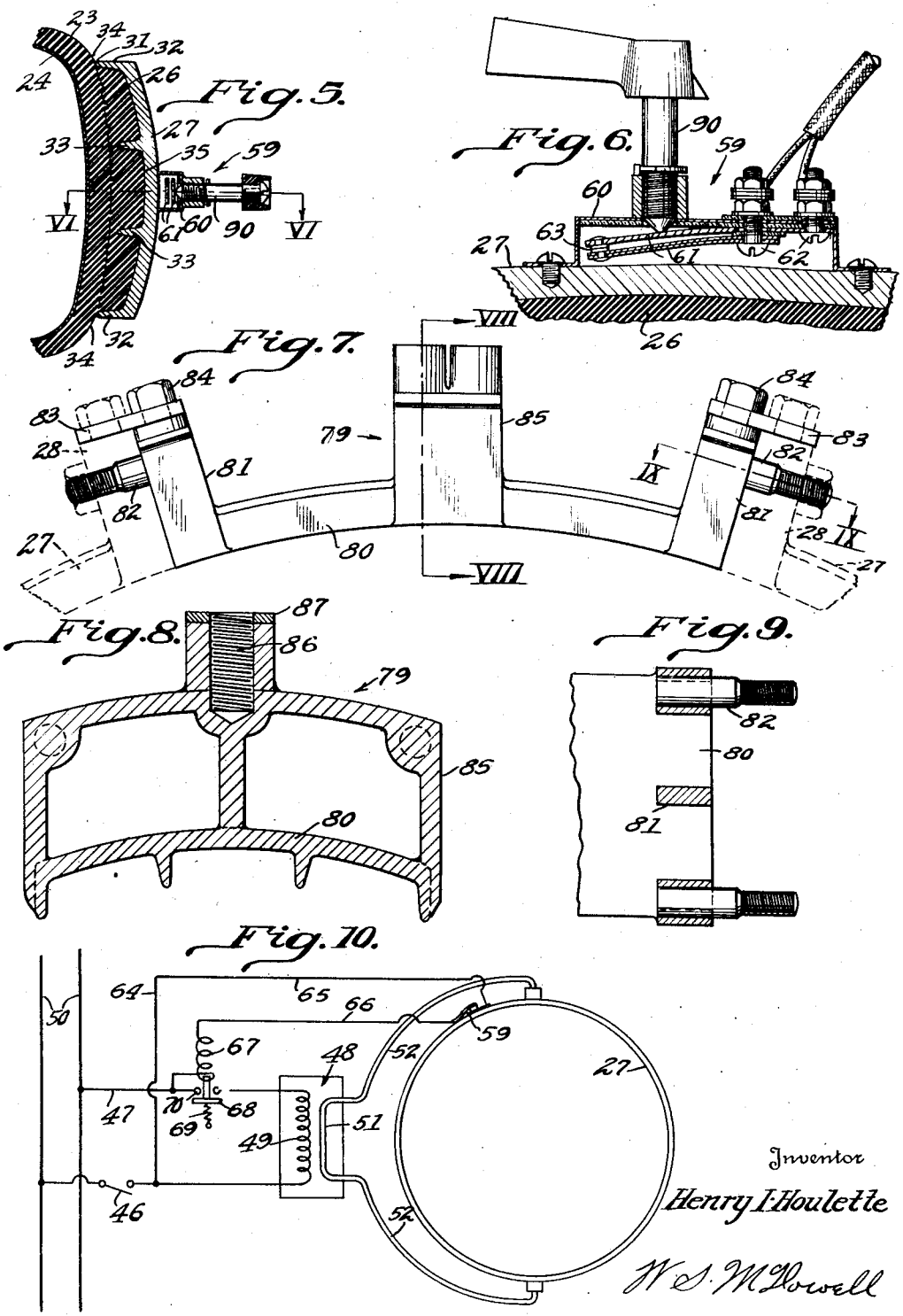

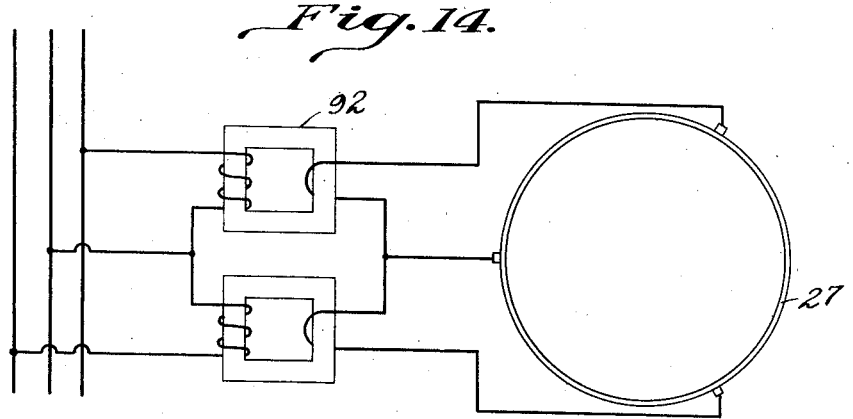
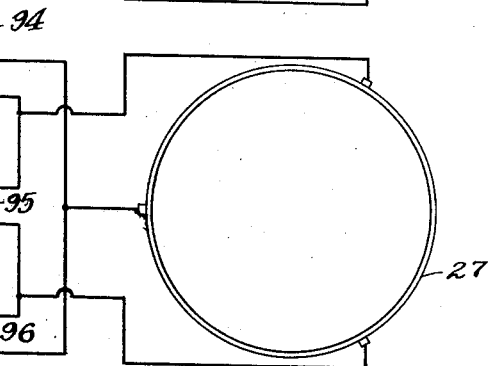
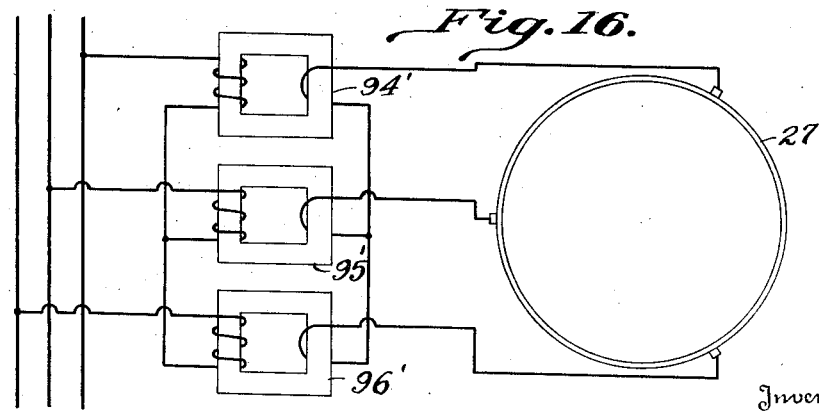

Patented Sept. 10, 1935

2,014,332

UNITED STATES PATENT OFFICE 2,014,332

APPARATUS FOR VULCANIZING RUBBER

Henry I. Houlette, Newark, Ohio, assignor to The Pharis Tire and Rubber Company, Newark, Ohio, a corporation of Ohio Application October 29, 1934, Serial No. 750,417

16 Claims. (Cl. 219—19)

This invention relates to an improved method and apparatus for heat treating rubber or rubber containing bodies to vulcanizing, curing or other critical temperatures and has for its primary object the provision of an improved method and apparatus whereby such heating may be accomplished in a simple, readily executed and economical manner.

In certain of its more specific aspects, the present invention provides improved means for effecting what is known as the retreading of worn pneumatic vehicle tires, although the present invention is not to be construed as specifically limited to such an operation, since its features are readily applicable to the manufacture of new tires, garden hose and many other rubber or rubber containing articles which require heat treatment during their processes of manufacture.

Numerous devices have been proposed and are now in commercial use for retreading worn vehicle tires. That is, when the crown or tread of such a tire becomes thin through the effects of wear and service but is otherwise intact and in good serviceable condition, apparatus is available by which a fresh band or body of rubber may be vulcanized around the crown of the worn tire tread to restore the rubber lost through wear and thus materially prolong the effective life and usefulness of such a retreaded tire. Theoretically, this plan appears quite practical but it is generally recognized that such retreaded tires do not give the same satisfactory service as a new tire. It is my belief that the primary difficulty is due to the improper application of heat to a tire undergoing retreading vulcanization.

Prior art devices for accomplishing such retreading operations usually comprise annular molds which surround a band of rubber placed on the worn tread or crown of a tire between the side walls thereof. Usually these molds are of metal and are heated to temperatures sufficiently high to effect vulcanization of the new rubber by the employment of coils, pipes or other passages formed in connection with the molds and through which steam or other analogous heated fluid is passed to raise the molds to required temperatures. Due to their physical form, such pipes, tubes or passages are spaced from one another with the result that uneven heating of the molds and rubber associated therewith takes place. That is, the portions of such a mold immediately adjacent to the tubes, pipes or passages become quite highly heated while the intervening portions of the mold, lying between such pipes or passages do not attain the same high temperature and in all retreading molds of which I now have knowledge employing steam or other highly heated vapor as the heating medium, it is physically impossible to attain uniform vulcanizing temperatures over the full surface area of the mold in contact with or within the immediate proximity of the rubber to be vulcanized.

Accordingly, it is an outstanding object of the present invention to provide an improved vulcanizing mold wherein the desired uniformity of temper in the use of the mold in vulcanizing operations can be readily and positively obtained, to the end that when a tire is retreaded, the renewed portion will be of uniform composition, temper, pliability and resiliency throughout the entire renewed region and being devoid of localized hard and soft areas as are inevitably present when ordinary heating methods and appliances are utilized.

I obtain this uniformity of heating through the provision of an improved mold comprising a band or ring of metallic construction, which is adapted to be placed around the circumferential tread portion of a pneumatic tire casing and contracted annularly into firm clamping engagement with said casing between its tread shoulders, whereby to confine a strip of uncured rubber, used in the restoration of the tread, within the physical limits of the band, and wherein provision is made for passing electrical energy directly through the band so that the latter will be caused to assume uniformly throughout all parts thereof a temperature sufficiently high to effect the vulcanization of the uncured rubber and its effective joinder or merger with the original rubber of the tire casing. In the manufacture of new tires, the molding band referred to is of greater cross sectional area and embraces the sides as well as the tread region thereof, but wherein the same principles of electrical heating of the band are utilized.

It is another object of the invention to provide the molding band with a thermostatic control switch, whereby when the molding band attains a predetermined temperature, current supply thereto is automatically terminated in order to prevent the band from attaining an excessively high temperature above desired limits, to provide for economy in current consumption, and to permit of the ready distribution of heat throughout the entire area of the band, the construction of the thermostatic switch being such that when the temperature of the molding band recedes to a lower level, current supply will be again automatically restored and the cycle of operation repeated, the switch serving to maintain uniform temperatures on the part of the molding band during active use thereof, the upper and lower limits being usually maintained within 10° F.

A further object of the invention rests in employing in connection with my improved electrically heated molds an efficient low loss transformer by means of which current available usually from commercial sources of electrical energy of relatively high voltage and low amperage may be transformed in the secondary circuit of the transformer into current of relatively high amperage and low voltage, the terminals of the secondary circuit of the transformer being directly connected with the terminals of the molding band, the said last-named terminals being spaced approximately 180° apart so that the current may be divided for uniform travel through paths of approximately 180° around and through the molding band.

This application constitutes a continuation-in-part of my prior application Serial No. 740,521 filed August 18, 1934.

For a further understanding of the invention, reference is to be had to the following description and the accompanying drawings, wherein:

Fig. 3 is a vertical sectional view taken through the apparatus on the plane indicated by the line III—III of Fig. 1;

Fig. 4 is a horizontal sectional view taken through the transformer on the plane indicated by the line IV—IV of Fig. 3;

Fig. 5 is a detail transverse sectional view taken through the molding band of the apparatus in the plane of the thermostatic control switch;

Fig. 6 is a vertical longitudinal sectional view taken through the thermostatic switch on the line VI—VI of Fig. 5;

Fig. 7 is a detail plan view of one of the insert blocks employed in varying the effective diameter of the molding band or ring;

Fig. 8 is a transverse sectional view taken through one of the blocks on the plane indicated by the line VIII—VIII of Fig. 7;

Fig. 9 is a detail horizontal sectional view through the terminal pins of an insert block on the line IX—IX of Fig. 7;

Fig. 10 is a diagrammatic view illustrating the wiring diagram used in connection with the apparatus;

Fig. 11 is a similar view disclosing a modified form of wiring wherein electrical current is supplied to the apparatus through a motor-generator set.

Fig. 12 is a detail vertical sectional view taken on the line XII—XII of Fig. 3;

Fig. 13 is a detail perspective view of one of the conductor plates showing the fusible strip;

Figure 1:
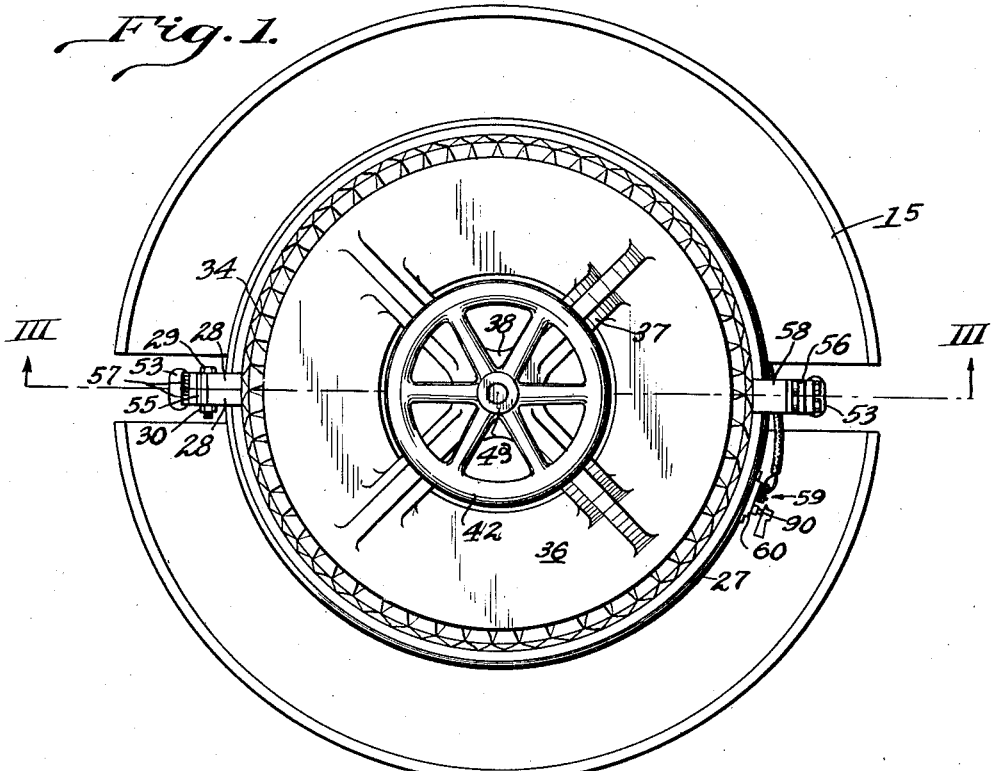
Fig. 1 is a top plan view of tire retreading apparatus constructed in accordance with the features of the present invention.

Figs. 14, 15, and 16 are diagrammatic views illustrating different transformer circuits.

In the accompanying drawings, there has been disclosed apparatus constructed in accordance with the features of the present invention specifically designed for the purpose of retreading used motor vehicle tires and, accordingly, the following description will be specifically addressed to this particular embodiment of my invention. It will be understood, however, that my invention is not limited to the specific function of retreading tires but, as previously stated, may be employed in the original manufacture of pneumatic tires or in the manufacture of other rubber or rubber containing articles.

In the particular form of the invention here under consideration, the numeral 15 designates a supporting frame or table which may be constructed to comprise spaced vertical legs 16 which are joined at their upper ends by means of horizontally disposed rails 17 and at their lower ends by a bed member 18. Arranged to rest on the upper surfaces of the top rail 17 is a horizontally disposed metallic plate 19 provided with a centrally disposed depending spider 20 which terminates in a collar 21 in which is formed a threaded opening 22. A pneumatic vehicle tire comprising an outer casing 23, an inner inflatable tube 24, and a metallic rim 25 may be placed horizontally on the upper surface of the plate 19 with one of the annular side walls of the tire casing in direct contact with the upper surface of the plate 19.

In the restoration of a tire having a worn tread surface, it is preferred that said tread surface, prior to being placed into the machine comprising the present invention, be buffed and cleaned to adapt it to a heat treating or vulcanizing operation. Upon this buffed surface of the tire tread between the side wall shoulders is placed a circumferentially applied strip of uncured rubber which in bulk possesses a sufficient amount of material so that when finally vulcanized, the original full cross sectional area of the tire will be restored. The raw uncured rubber strip is applied to extend circularly around the tread of a used tire and is designated by the numeral 26.

Figure 2:
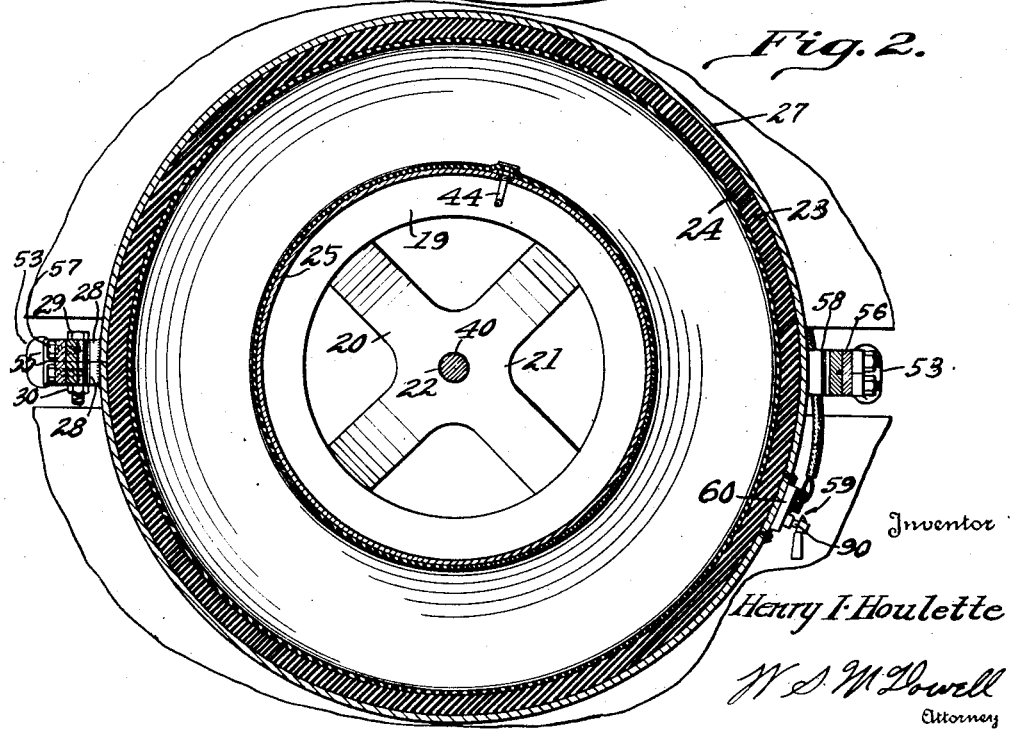
Fig. 2 is a horizontal sectional view taken through the apparatus on the plane indicated by the line II—II of Fig. 3.

In order to heat the rubber strip 26 to effect vulcanization thereof in connection with the tire casing, the said strip has clamped thereabout a metallic molding band or ring 27. Preferably, this ring is machined from a relatively heavy section of rolled steel, ordinarily referred to as "boiler-plate". As shown in Figs. 1 and 2 particularly, the band or ring is of substantially circular form and includes split relatively separable ends which may be readily separated in order to expand the said ring or band sufficiently to enable it to be placed over and in close engagement with the crown of a vehicle tire. Formed with the separable ends of the ring or band 27 are outwardly and radially directed terminal lugs 28, formed with transversely registering openings, which are adapted for the reception of headed bolts 29, the threaded ends of the latter being provided with nuts 30 which, when tightened, draw the lugs 28 together and circumferentially contract the molding band into firm positive engagement with the circular crown of a tire casing as indicated at 23.

In transverse cross section, the molding band or ring is machined to conform with the convex configuration of the tire crown 31 and, in addition, the said band or ring is further formed to include annular side ribs 32—32 and spaced parallel intermediate ribs 33—33 which extend circularly around the tire crown, the ribs 32—32 being engaged directly with the crown contiguous to the side shoulders 34 of the tire. By this construction, the strip of raw rubber 26 is crowded into the confines of the molding band so as to substantially completely fill the chamber 35 provided between the tire crown 31 and the inner surfaces of the molding band or ring.

To further insure outward expansion of the tire into engagement with the molding ring or band, there is placed on the upper side surface of the tire, when the latter is placed horizontally upon the plate 19, a pressure plate 36 which corresponds in construction to the plate 19. The spider 37 of the plate 36 has its collar 38 formed with a plain opening 39 for the reception of the non-threaded portion of the stem 40 of a clamping screw 41, the upper end of the latter being provided with a hand wheel 42 which includes a hub 43 arranged to engage directly with the collar 38. The threaded end of the stem 40 is received in the threaded opening 22 of the collar 21 provided in connection with the lower metallic plate 19 so that by the rotation of the wheel 42, the upper plate 36 will be drawn into firm clamping engagement with the upper of the side walls of the tire casing so that an outward expansive movement will be imparted to the tire casing to cause it to closely engage with the molding band or ring 27. In addition, the inner tube 24 of the casing may be filled with air under relatively high pressures to further cause such outward expansion of the tire casing. The admittance of compressed air into the tube 24 or its escape therefrom may be effected through the provision of the usual valved nipple 44.

In order to heat the molding band or ring by electrical energy and to control such heating, the supporting frame 15 is provided preferably with a manually operated control switch 46 which is arranged in a primary circuit 47 of a transformer 48, the detail construction of the latter being disclosed in Figs. 3 and 4 and diagrammatically illustrated in Fig. 10. As shown in Fig. 10, the primary circuit includes a primary field 49, constituting a part of the transformer so that when the switch 46 is closed, excitation of the field 49 takes place. The primary circuit 47 is connected at its terminals with trunk conductors 50 which may receive electrical energy from commercial sources or which may be developed locally.

Arranged within the primary field 49 is the secondary coil 51 of the transformer which terminates in integral branching conductors 52—52 which have their outer ends connected with terminal lugs 53, the latter being secured as at 54 to the lower ends of conductor plates 55 and 56, the former being detachably connected by means of bolts or the like 57 to the terminal lugs 28 which are welded to or otherwise formed with the separable ends of the molding band or ring 27, while the plate 56 is preferably welded at its upper end to a terminal bridge 58 welded or otherwise joined with the ring or band 27 in substantially diametrical relationship to the lugs 28.

In cross sectional formation, the terminals 28 and 58 are quite similar and are so shaped and formed that upon the passage of electrical current therethrough, the same will become more highly heated than corresponding adjoining areas of the molding ring or band 27. This construction is necessary or advantageous due to the intermittent flow of current to the heating elements of the apparatus, as will be later described. It has been found that during periods when current is not passing through the terminals 28 and 58, there apparently exists at these points a drain for the developed heat. It will be understood that the plates 55 and 56 and the conductors 52 are formed from copper or other similar metal of high electrical conductivity, which are also good heat conductors, so that when current supply is cut off to the terminals 28 and 58, the associated conductors are believed to act as heat drains, causing an undesired cooling or lowering of vulcanizing temperatures in the immediate regions of the terminals 28 and 58. It has been found that by contracting the cross sectional formation of the terminals 28 and 58, or by the use of metals which upon the passage of electrical current therethrough develop heat at a higher rate than the metal from which the molding band is formed, a practical means is provided for preventing the presence of low vulcanizing temperatures in the regions of said terminals and I am thus enabled to balance thermal conditions throughout the entire area of the molding band to obtain uniform heat application to the rubber articles undergoing vulcanization which I find necessary in a process of this character.

It is also important to carefully regulate the introduction of electrical energy into the molding band for the purpose of preventing the molding band from attaining excessively high temperatures, to equalize such temperatures throughout the molding band and to obtain operating economy in the matter of current consumption. This control may be automatically obtained by the provision of a bi-metal thermostat as indicated at 59. In this instance, the thermostat 59 comprises a housing 60 which is secured directly to the outer wall of the band 27. Within the housing are mounted the customary flexing strips 61—61 which have different coefficients of expansion, the said strips being mounted in connection with the housing by means of electrically independent threaded fasteners 62—62. The outer free ends of the strips 61 may be provided with contacts 63. A shunt circuit 64, as shown in Fig. 10, is connected with the primary circuit 47 of the transformer and includes conductors 65 and 66 which extend to the fasteners 62. In this instance, the conductor 66 includes a coil 67 employed for the purpose of attracting the core of a magnetic switch 68, causing the latter to move against the resistance of a spring 69 to bridge the terminals 70 of the primary circuit. Thus when the strips 61 of the thermostatic switch 59 are in engagement, the closing of the hand operated switch 46 results in energizing the shunt circuit 64, causing the closing of the magnetic switch 68 and the consequent closing of the primary circuit 47 with the travel of induced current through the secondary side of the transformer to the molding band 27. When the latter attains a desired high temperature such, for example, as 300° F., the heat radiated from the molding band contiguous to the thermostatic switch 59, effects sufficient flexure of the strip 61 to cause separation of the contacts 63 thereof, thereby opening the shunt circuit, deenergizing the coil 67 and allowing the switch 58, under the influence of the spring 69, to assume an open position, causing the interruption of the primary circuit.

I have found that the molding band or ring tends to cool quite slowly and to retard this rate of cooling by loss of heat to the atmosphere, I may, if desired, coat the external surfaces of the molding band with a suitable heat insulating material. During this period of cooling, uniform distribution of the heat throughout the band takes place to avoid the effects of any local overheating of the band which might be present during the passage of electrical current therethrough. While I preferably form the band from a rolled homogeneous steel of uniform metallographic formation, as contrasted with a casting having a more open or irregular grain structure, yet I find that at times certain portions of the band during the process of heating may develop a higher temperature than others. However, I have found that when the current supply to the band is interrupted by the operation of the thermostat 59, during the subsequent cooling period, thermal balance throughout the band takes place, thereby overcoming any tendency for the band to locally overheat. Since the periods of cooling are considerably longer in duration than the periods of introducing current into the band for heating purposes, the desired uniformity of temperature is attained for requisite periods of time to accomplish the ends sought by the present invention.

To obtain economy in current consumption and at the same time to provide a flow of current through the molding band of a character sufficient to meet its thermal needs, I found it necessary to develop a low-loss transformer of unusual design. This transformer has been disclosed particularly in Figs. 3 and 4 wherein it will be noted that the same comprises a laminated pack of metallic plates 71 compactly retained in a frame 72 mounted in connection with the bed member 18 of the supporting frame 15. The plates 71 are provided with spaced registering slots 73 in which are situated the primary field windings 49 of the transformer and also the loops of the secondary coil 51. As has been pointed out, the loops 51 are integrally formed with the conductors 52 which extend to the terminal plates 55 and 56 in order to avoid electrical losses which are occasioned when separable clamp-held connections are used. The conductors 51 are guided through openings 74 formed in a vertically adjustable frame 75, which is located above the frame 72 by means of the screw threaded supports 76. By the frame 75, positioning tension may be readily imparted to the secondary loop or coil 51. The transformer as thus constructed is compact, efficient and relatively inexpensive and serves to transform current supplied by ordinary commercial circuits, into a sluggish heating current of high amperage and low voltage, for instance, a secondary current of the order of 2000 to 4000 amperes and 2 to 3 volts.

Of course, other electrical arrangements are possible for supplying the proper degree of current to the molding band to effect its uniform heating. For instance, as disclosed in Fig. 11, the transformer may be eliminated and in lieu thereof a motor generator set, as indicated at 77, may be used, the generator being of a type capable of producing a current having the heating characteristics necessary to effect the desired operation of the molding band, that is, the generator 77 is wound so that its output circuit 78 will carry a low voltage with a high amperage. The form of the invention disclosed in Fig. 11, however, is not considered as desirable from the standpoint of operating economy as the employment of the transformer 48 and whenever ordinary commercial circuits are available, said transformer will be employed.

By reason of the split construction of the molding band 27, the latter is readily adaptable to the retreading of tires of varying diameters. For example, when a tire possesses a diameter in excess of the normal internal diameter of the molding ring so that the bridge lugs 28 can not be brought into close engagement as disclosed in Figs. 1 and 2, I compensate for this by the employment of one of a plurality of metallic insert sections 79. Each of these insert sections preferably possesses the formation disclosed in Figs. 7 to 9 inclusive, the said sections merely varying from one another in their arcuate lengths in conformity with the variations in standard tire size. Each of the sections 79 comprises an arcuate metallic body 80 conforming in longitudinal and transverse curvature and formation to the general shape of the molding band 27, the body 80 terminating at its ends in outwardly and radially directed bridge terminals 81 from which project threaded studs 82, which are adapted to be received within registering openings formed in the bridge lugs 28, the threaded ends of the studs 82 being formed for the reception of nuts for binding the terminals 81 in firm frictional contact with the adjoining surfaces of the lugs 28. However, surface to surface contact between the lugs 28 and the terminals 81 is not relied upon for the purpose of transmitting current from the insert section to the adjoining portions of the molding band.

Since both the molding band and insert sections are preferably formed from rolled steel, there may be some tendency for the adjoining surfaces to oxidize and set up undesired resistances. To minimize such resistances, there is secured to the outer ends of the lugs 28 and the terminals 81 conductor bars 83 of a low resistance metal such, for example, as copper, the bars 83 being held in place in connection with the respective terminals by clamping bolts or nuts 84. Current enters the insert sections, when the latter are used in the molding ring assembly, by providing each of the sections 79 with a central or intermediate bridge 85 which conforms in cross section to the shape of the lugs 28 and the terminals 81. Each intermediate bridge 85 is provided with a pair of threaded sockets 86 for the reception of the bolts 57 employed in uniting the copper plates 56 in firm electrical contact with the central bridge 85. Preferably the outer ends of the bodies in which the sockets 86 are formed are provided with bronze or other similar facing material 87, which may be readily cleaned for the purpose of preserving a good electrical contact and to minimize resistance which might be set up through oxidization of a steel surface. As a safety feature, the plate 56 may be composed of two copper sections joined as at 88 by means of a strip of metal having a relatively low fusion point. Through the use of this construction, in the event of failure, for instance, of the thermostatic switch 59 and consequent overheating of the molding band, excessive overheating or damage to said band will be prevented by the fusion of the strip 88, which will cause separation of the two sections of the plate 55 in order to break the secondary circuit leading from the transformer.

In the use of the apparatus, a tire to be retreaded, including the casing 23, the inner tube 24 and the rim 25, is placed horizontally on the plate 19 of the supporting table 15, the tread surface of the casing having first been buffed to adapt it to a vulcanizing operation. The strip 26 of raw rubber may then be applied to the tread of the tire casing while the latter is positioned on the plate 19 or prior to such positioning, the said strip of raw rubber extending around the outer circumference of the tire casing. The next step resides in clamping around the raw rubber strip and the outer circumference of the tire the electrically heated molding band 27. If the normal diameter of the molding band conforms with that of the tire, the split ends of the molding band are directly secured as disclosed in Figs. 1 and 2, but if the tire is of a greater diameter, the insert sections are employed in the manner disclosed in Fig. 7. To force the tire outwardly into firm engagement with the molding band assembly, the inner tube which may be partly inflated tends to accomplish this and in addition, the upper plate 36 is placed on the upper side wall of the tire casing and the hand screw 41 is operated to compress the tire transversely and thereby effect outward expansion of the same into firm contact with the molding band. Compressed air under higher pressure may then be introduced into the inner tube to still further effect such expansion. With the tire in this position and firmly clamped in the heating assembly, the switch 46 is closed by operating the handle indicated at 89, which effects the transmission of current from the secondary side of the transformer through the molding band assembly. From then on, the operation becomes automatic and requires no further attention on the part of the machine operator until the vulcanization operation is desired to be terminated.

During the heating cycle, the molding band reaches a predetermined temperature, at which time the thermostatic switch 59 opens automatically in response to the thermal conditions of the molding band, interrupting current flow to the apparatus. This causes a slow cooling of the molding band assembly and an equalized distribution of heat throughout the full area thereof. When the temperature of the molding band assembly recedes to a predetermined level, the thermostatic switch again functions automatically to restore current flow to the molding band assembly and this cycle of operation is repeated for a period of time varying between 20 to 40 minutes, at which time the operator manually operates the switch 46 to arrest the operation of the device, removes the upper ring plate 36, releases the molding band from connection with the tire, and then removes the tire from the table in a finished state. These operations may be carried out conveniently and expeditiously.

If desired, the operator may be equipped with a clamping tool (not shown) for assisting in drawing the bridge lugs 28 into close engagement in order to unite said bridge lugs by means of the screws or bolts employed for that purpose, or in releasing the same. Also, the thermostatic switch 59 may be equipped with an adjusting screw 90 which cooperates with the bimetal strips 61 to provide for variation in the response of the thermostatic switch to different temperatures. It will be understood that the inner surfaces of the molding band, and likewise the insert sections, may be grooved or ribbed to provide either plain or antiskid designs of any desired type on a completed and retreaded tire surface.

By the construction of the apparatus disclosed, I attain the desired uniformity of heat application to the bodies of rubber undergoing vulcanization, whereby to secure an effective merger or joinder of the added rubber to the old rubber of a tire casing which will not loosen or separate under later conditions of service, and again, the construction produces a retreaded tire of true symmetry and balance wherein the newly applied tread will be of uniform composition throughout the full area thereof and devoid of hard and soft spots produced by imperfect heating during vulcanization.

In Figs. 14, 15, and 16, circuits have been illustrated permitting of the use of three-phase circuits and these arrangements may be particularly useful when the apparatus is called upon to vulcanize large size tires, such as those used on heavy motor vehicles. In Fig. 14, the transformers 91 and 92 are connected in "open-delta" order on both the primary and secondary. Also the three leads of the secondary are connected at three equi-distantly spaced points to the molding ring 27, the terminals of the latter being spaced 120° apart rather than 180° as when a single phase circuit is used.

In Fig. 15, an analogous arrangement is disclosed wherein three transformers 94, 95, and 96 are connected in "delta-delta" order on both primary and secondary, whereas in Fig. 16, the three transformers 94', 95', and 96' are connected in "star-star" order on both the primary and secondary sides thereof.

What is claimed is:

1. In tire vulcanizing apparatus, a metallic molding annular ring formed to engage the circumference of a motor vehicle tire, means for uniformly heating said ring over its full area by the passage of an electric current therethrough, and a thermostatic switch in thermal relationship with said ring for regulating the passage of current through said ring for maintaining the latter during vulcanizing cycles within predetermined temperature limits.

2. Tire vulcanizing apparatus comprising: a metallic annular ring formed to circumferentially and directly engage with the tread of a pneumatic vehicle tire, clamping means for retaining said ring in firm contact with said tread, spaced terminals carried by said ring for connection with a source of electrical energy, whereby to cause uniform current flow through said ring with the latter acting as a heat developing resistant conductor, and thermostatic means arranged in thermal relationship with said ring for intermittently regulating the passage of electric current through said ring to maintain the latter during vulcanizing cycles thereof within predetermined temperature limits.

3. Rubber vulcanizing apparatus comprising a split metallic annular ring, means for contracting said ring into firm holding engagement with a rubber or rubber-containing body to be vulcanized, means for uniformly heating the entire body of said ring by the passage of electric current directly therethrough, and thermostatic switch means mounted in termal relationship with respect to said ring for governing the passage of electric current through said ring, whereby to maintain the latter at predetermined vulcanizing temperatures.

4. In a vulcanizing apparatus, a mold comprising an annulus of metal, circuit terminals secured to said annulus for passing an electric current directly through said annulus to heat the latter to rubber vulcanizing temperatures, said terminals being spaced approximately 180° apart, and thermostatic control means in direct thermal conducting relation with said annulus for regulating the passage of electric current through said annulus.

5. In rubber vulcanizing apparatus, a metallic ring mold, a transformer including primary and secondary circuits, means for connecting the terminals of the secondary circuit to said ring mold, a normally closed thermostatic switch in thermal relationship with said mold, a normally open magnetically operated switch in said primary circuit, and a shunt circuit connected with said thermostatic switch and the current input leads of said primary circuit, said shunt circuit being connected with the field of the magnetic switch, whereby upon the passage of current through said shunt circuit, said magnetic switch will be attracted to close said primary circuit.

6. In vulcanizing apparatus, a metallic molding ring, a transformer including a primary and a secondary circuit, the terminals of said secondary circuit being connected with said molding ring on diametrically opposite sides thereof, and thermostatic switch means arranged in thermal relationship with said molding ring for controlling the passage of current through the primary circuit of said transformer, whereby to maintain said molding ring during operation thereof within predetermined temperature limits.

7. In vulcanizing apparatus, a metallic ring mold, diametrically opposed terminals formed with said mold, and means for delivering an electric current of relatively high amperage and low voltage to said terminals for direct passage to the body of said mold to heat the latter to vulcanizing temperatures, said terminals possessing electric conductivity values by which they become heated to a higher temperature than the body of said mold, whereby to compensate for heat draining from said terminals during periods of cessation of the passage of electrical energy therethrough.

8. In vulcanizing apparatus, a mold comprising a transversely split ring, bridge lugs formed at the ends of said ring, a metallic insert section conforming to the circular configuration of said mold and positioned between said bridge lugs, securing means uniting the ends of said insert section with said lugs, and a terminal for the connection of a current conveying conductor formed with said insert section between the ends thereof.

9. As a new article of manufacture, a split metallic molding band of circular formation, terminal lugs projecting outwardly and radially from the ends of said band, a diameter controlling insert section for said band, means for mechanically securing the ends of said insert section to the lugs of said band, means for electrically uniting the ends of said insert section with said lugs, and means formed intermediately of the length of said insert section for connecting an electrical conductor therewith.

10. In vulcanizing apparatus, an annular mold comprising a metallic resistor portion, electric terminals on said mold and means for delivering an electric current of relatively high amperage and low voltage to said terminals to heat the resistor portion of the mold to vulcanizing temperatures, said terminals possessing electric conductivity values by which they become heated to a higher temperature than the metal of said mold, whereby to compensate for heat draining from said terminals.

11. Tire retreading vulcanizing apparatus comprising a metallic band split transversely so that the ends of said band terminate in adjoining relationship, means for contracting said molding band into firm holding engagement with the tread region of a pneumatic vehicle tire, and means for heating the entire body of said band by the passage of an electric current directly therethrough to rubber vulcanizing temperatures, said band having sufficient tensile strength to resist vulcanizing pressures without reinforcement.

12. In tire retreading apparatus, a mold comprising a band of metal having transversely split abutting ends, clamping means connected with the split ends of said band for contracting the latter circumferentially into firm engagement with the tread of a tire, and means for passing an electrical current directly and uniformly through all portions of said band to heat the latter by its own internal resistance to rubber vulcanizing temperatures, said band being of sufficient thickness to store a substantial amount of heat and of sufficient strength to withstand an operative retreading vulcanizing pressure.

13. A tire vulcanizing assembly including an annular base plate, a friction plate auxiliary to said base plate and mechanically cooperative therewith to hold a tire casing therebetween, an annular metal matrix electrical resistor concentric with said tire casing, and an air bag adapted to be placed in said casing to force it against the matrix, said matrix being capable of withstanding the pressure developed by the air bag.

14. In the art of vulcanizing tires, an annular metallic mold of sufficient strength to withstand pressures used in vulcanizing, and a source of electrical energy feeding an electric current through said mold as an electrical resistor.

15. In the art of retreading tires, an annular metallic mold, an air bag for pressing a tire against the mold, a source of electrical energy feeding an electrical current through said mold as an electrical resistor, said mold being of sufficient strength to withstand the pressure developed by said air bag.

16. As a new article of manufacture, a split annular circumferential metal electrical resistor tire vulcanizing matrix of sufficient current carrying capacity of the order of 2000 amperes and heat storage capacity to function operatively to vulcanize a retreading rubber tire operation when an intermittent electrical current is passed therethrough.

HENRY I. HOULETTE.